(12) United States Patent
Cheng et al.

(10) Patent No.: US 12,096,102 B1
(45) Date of Patent: Sep. 17, 2024

(54) RUGGEDIZED OPEN AIR DUAL-FACING CAMERA WITH VEHICLE-MOUNT

(71) Applicant: Samsara Inc., San Francisco, CA (US)

(72) Inventors: Li-Wei Cheng, New Taipei (TW); Andrew Deagon, San Francisco, CA (US); Christian Almer, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 6 days.

(21) Appl. No.: 17/660,988

(22) Filed: Apr. 27, 2022

(51) Int. Cl.
| | |
|---|---|
| *H04N 23/51* | (2023.01) |
| *B60R 11/04* | (2006.01) |
| *F16M 11/04* | (2006.01) |
| *F16M 13/02* | (2006.01) |
| *G03B 17/56* | (2021.01) |
| *G03B 30/00* | (2021.01) |
| *H04N 7/10* | (2006.01) |

(Continued)

(52) U.S. Cl.
CPC .............. *H04N 23/51* (2023.01); *B60R 11/04* (2013.01); *F16M 11/041* (2013.01); *F16M 13/022* (2013.01); *G03B 17/566* (2013.01); *G03B 30/00* (2021.01); *H04N 7/10* (2013.01); *H04N 23/45* (2023.01); *H04N 23/54* (2023.01); *H04N 23/57* (2023.01); *H04N 23/55* (2023.01)

(58) Field of Classification Search
CPC ........ H04N 23/45; H04N 23/50; H04N 23/51; H04N 23/52; H04N 23/54; H04N 23/55; H04N 23/57; H04N 7/10; G03B 17/02; G03B 17/08; G03B 17/561; G03B 17/566; G03B 30/00; G03B 2217/002; G06F 1/1605; G06F 1/1686; F16M 11/04; F16M 11/041; F16M 13/02; F16M 13/022; F16M 13/027; F16M 2200/00–08; B60R 11/04; B60R 2300/00
See application file for complete search history.

(56) References Cited

U.S. PATENT DOCUMENTS

| | | | | |
|---|---|---|---|---|
| 8,870,475 | B1 * | 10/2014 | Bennett ................... | H04N 23/54 |
| | | | | 396/419 |
| 9,229,299 | B1 * | 1/2016 | Morlon ................... | F16M 13/04 |

(Continued)

FOREIGN PATENT DOCUMENTS

| | | | | |
|---|---|---|---|---|
| JP | 2000241869 | * | 9/2000 | ............. G03B 17/14 |

*Primary Examiner* — Twyler L Haskins
*Assistant Examiner* — Akshay Trehan
(74) *Attorney, Agent, or Firm* — Schwegman Lundberg & Woessner, P.A.

(57) ABSTRACT

A system having a camera assembly and a communication coupling extending from the camera assembly is provided. The camera assembly can include a first enclosure having a first window and a second enclosure having a second window. The second enclosure can be opposite the first enclosure and couple with the first enclosure to form a cavity. The camera assembly can include a port disposed in one of the first enclosure and the second enclosure and a dual-facing camera disposed within the cavity. The dual facing camera can have a first camera facing a first direction and a second camera facing a second direction opposite the first direction. The first camera can align with the first window and the second camera can align with the second window when the dual-facing camera is disposed within the cavity. The communication coupling can couple with the dual-facing camera and extend through the port.

12 Claims, 7 Drawing Sheets

(51) Int. Cl.
*H04N 23/45* (2023.01)
*H04N 23/54* (2023.01)
*H04N 23/55* (2023.01)
*H04N 23/57* (2023.01)

(56) References Cited

U.S. PATENT DOCUMENTS

| | | | | |
|---|---|---|---|---|
| 9,507,245 | B1* | 11/2016 | Druker | F16M 13/02 |
| 10,597,002 | B1* | 3/2020 | Baldovino | B60H 1/00735 |
| 10,768,508 | B1 | 9/2020 | Woodman | G03B 17/14 |
| 2007/0206945 | A1* | 9/2007 | DeLorme | G03B 41/00 |
| | | | | 396/332 |
| 2012/0019940 | A1* | 1/2012 | Lu | H04N 23/57 |
| | | | | 359/819 |
| 2015/0195442 | A1* | 7/2015 | Pacurariu | H04N 23/66 |
| | | | | 348/211.2 |
| 2019/0028617 | A1* | 1/2019 | Odom | G06T 1/20 |
| 2019/0238800 | A1* | 8/2019 | Chuang | G08B 13/19619 |
| 2019/0339593 | A1* | 11/2019 | Mayville | G03B 17/561 |
| 2020/0133095 | A1* | 4/2020 | Cotoros | G02B 27/0006 |
| 2020/0278096 | A1* | 9/2020 | Pereira | F21S 8/085 |
| 2021/0011283 | A1* | 1/2021 | Dubey | G02B 27/0006 |
| 2022/0043326 | A1* | 2/2022 | Eckman | H05K 5/0008 |
| 2022/0060637 | A1* | 2/2022 | Prangenberg | F16M 11/14 |
| 2022/0400192 | A1* | 12/2022 | Vitale | G02B 7/003 |
| 2022/0400196 | A1* | 12/2022 | Vitale | H04N 23/57 |

* cited by examiner

RUGGEDIZED OPEN AIR DUAL-FACING CAMERA WITH VEHICLE-MOUNT

TECHNICAL FIELD

Examples of the present disclosure relate generally to cameras that can be used in an outdoor environment and, more particularly, but not by way of limitation, to a case that can be used with cameras in an outdoor environment.

BACKGROUND

Cameras that can be used with vehicular applications have become omnipresent. Furthermore, these cameras are able to transmit data captured by the camera in order to store the captured data for retrieval at a later time. However, in order to properly capture data and transmit the captured data, cameras that are used with vehicular applications must remain in a restrictive environment that shields the camera from outdoor elements, such as temperature fluctuations and inclement weather. Thus, cameras are restricted to vehicles that are able to provide an indoor environment within which the camera can operate.

SUMMARY

Examples provide a system that allows for the outdoor mounting of a camera that can be used with vehicular applications. In examples, the system includes a first enclosure that couples with a second enclosure to form a cavity. A dual-facing camera can be disposed within the cavity formed by the first enclosure and the second enclosure. In order to facilitate data capture by the dual-facing camera, each of the first and second enclosures can include windows that respectively align with first and second cameras of the dual-facing camera. In examples, the dual-facing camera communicates with a vehicle gateway. The vehicle gateway can wirelessly transmit data captured by the dual-facing camera to a remote server. In examples, one of the first or second enclosures includes a port through which a cable extends. The cable can couple with both the dual-facing camera when the dual-facing camera is disposed within the cavity and with the vehicle gateway. Thus, the dual-facing camera can transmit captured data to the vehicle gateway via the cable.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative examples of the disclosure. In the following description, for the purposes of explanation, numerous specific details are set forth in order to provide an understanding of various embodiments of the inventive subject matter. It will be evident, however, to those skilled in the art, that examples of the inventive subject matter may be practiced without these specific details. In general, well-known instruction instances, protocols, structures, and techniques are not necessarily shown in detail.

Examples provide a system that allows for the outdoor mounting of a camera that can be used with vehicular applications. In examples, the system includes a first enclosure that couples with a second enclosure to form a cavity. A dual-facing camera can be disposed within the cavity formed by the first enclosure and the second enclosure. In order to facilitate data capture by the dual-facing camera, each of the first and second enclosures can include windows that respectively align with first and second cameras of the dual-facing camera. In examples, the dual-facing camera communicates with a vehicle gateway. The vehicle gateway can wirelessly transmit data captured by the dual-facing camera to a remote server. In examples, one of the first or second enclosures includes a port through which a cable extends. The cable can couple with both the dual-facing camera when the dual-facing camera is disposed within the cavity and with the vehicle gateway. Thus, the dual-facing camera can transmit captured data to the vehicle gateway via the cable.

Figure 1:
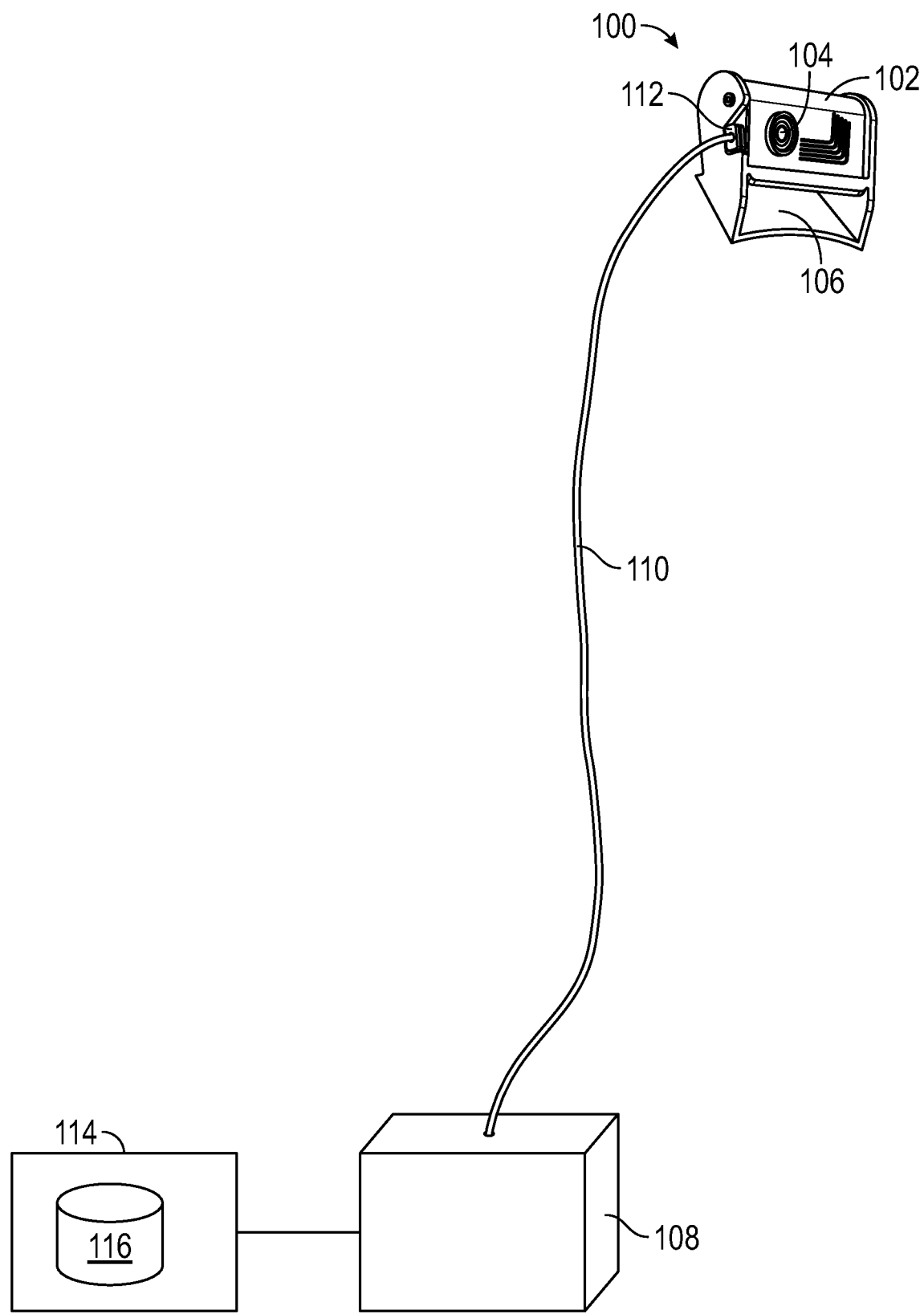
FIG. 1 illustrates a system having a dual-facing camera in communication with a network node via a communication coupling, according to some examples.

Now making reference to the Figures, and more specifically to FIG. 1, a system 100 is shown in accordance with some examples. The system 100 can include a camera assembly 102 having a dual-facing camera 104 disposed within the camera assembly 102. In addition, the camera assembly 102 can couple with a mount 106 in order to keep the camera assembly 102 stationary during use of the system 100. The system 100 can also include a network node 108 that is configured to receive data captured from the dual-facing camera via a communication coupling 110 that extends from the camera assembly 102 through a port 112 of the camera assembly 102.

Figure 2:
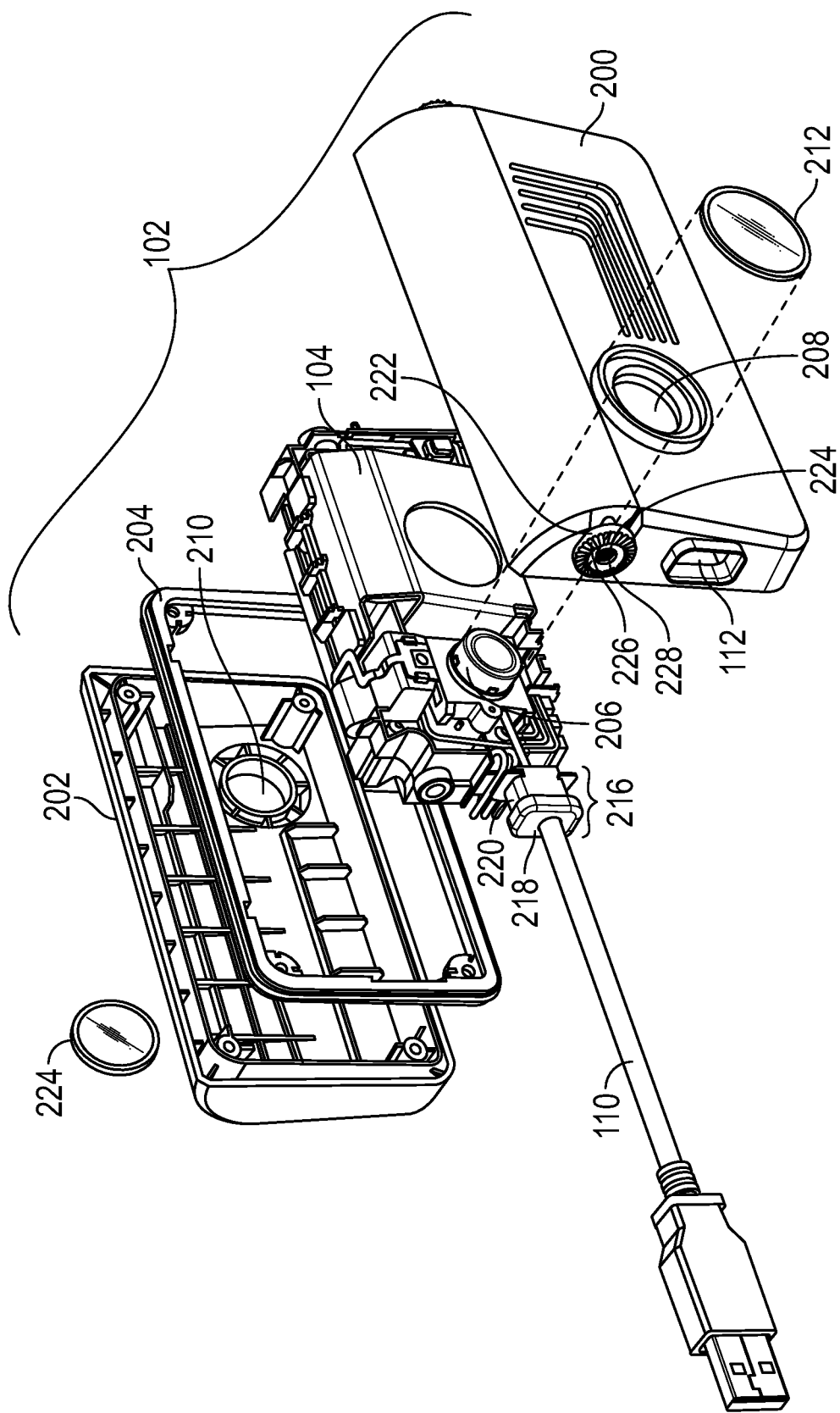
FIG. 2 is an exploded view of the dual-facing camera of FIG. 1, according to some examples.
Figure 3:
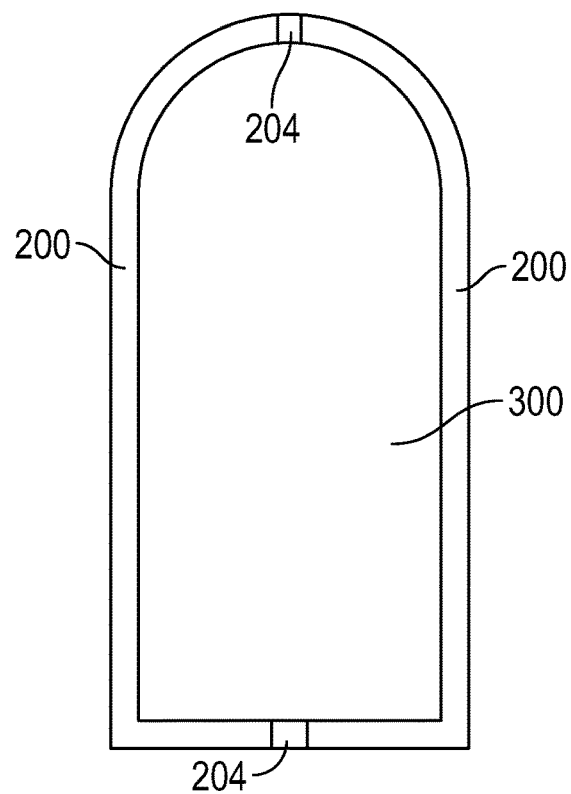
FIG. 3 shows a cavity formed by first and second enclosures of the dual-facing camera shown with reference to FIG. 2, according to some examples.

Now making reference to FIG. 2, the camera assembly 102 can include a first enclosure 200 along with a second enclosure 202 configured to couple with the first enclosure 200. In an example, the first enclosure 200 and the second enclosure 202 can couple with each other to form a cavity 300, as shown with reference to FIG. 3. The first enclosure 200 can couple with the second enclosure 202 using any suitable technique such as threaded fasteners, rivets, an adhesive, or the like in order to form the cavity 300. Moreover, each of the first enclosure 200 and the second enclosure 202 can have a thickness in a range from about two millimeters to about three millimeters. Additionally, each of the first enclosure 200 and the second enclosure 202 can be formed from a material capable of withstanding temperature fluctuations in a range between 0° F. to 120° F. An example of a material that can be used can include any type of Polycarbonate.

Returning attention to FIG. 2, the dual-facing camera 104 can be between the first enclosure 200 and the second enclosure 202. In particular, the dual-facing camera 104 can be disposed within the cavity 300 when the first enclosure 200 and the second enclosure 202 are coupled with each other. The camera assembly 102 can also include a gasket 204 that can be disposed between the first enclosure 200 and the second enclosure 202 when the first enclosure 200 and the second enclosure 202 are coupled with each other, as shown with reference to FIGS. 2 and 3. In an example, the gasket 204 can be formed from an elastomer, Teflon™, or the like. Furthermore, the gasket 204 can be an o-ring, a face seal, or have any type of geometry that lends itself to providing a sealing engagement between the first enclosure 200 and the second enclosure 202.

Figure 4:
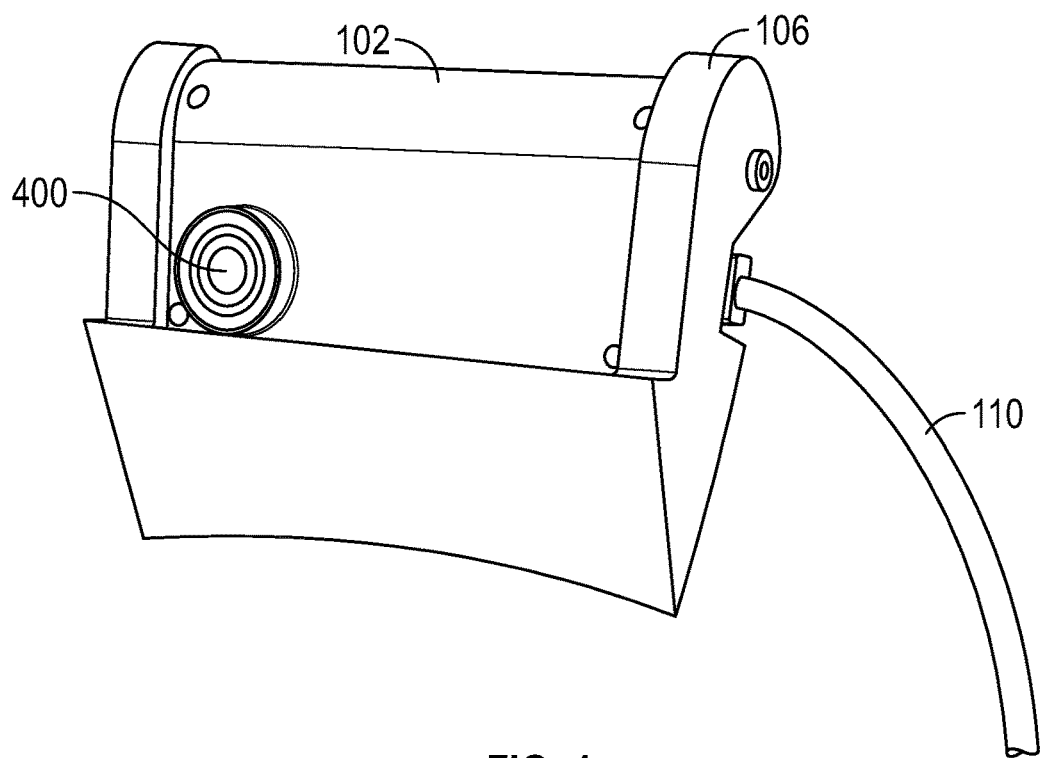
FIG. 4 illustrates a camera of the dual-facing camera of FIG. 1, according to some examples.

The dual-facing camera 104 can be a camera that is capable of simultaneously capturing video data in opposing directions. In particular, the dual-facing camera 104 can include a first camera 206 that faces a first direction and a second camera 400 (FIG. 4) that faces a second direction which is opposite the first direction. Furthermore, the dual-facing camera 104 can be capable of providing data captured by the dual-facing camera 104 to a remote end point, such as a remote server. An example of a dual-facing camera that can be used can be the CM32 Dual-facing Dash Cam available from Samsara, headquartered in San Francisco, California.

In an example, each of the first enclosure 200 and the second enclosure 202 can include windows that align with each of the first camera 206 and the second camera 400. More specifically, the first enclosure 200 can include a first window 208 that aligns with the first camera 206. Thus, when the dual-facing camera 104 is disposed within the first enclosure 200 and the second enclosure 202, the first camera 206 can capture video data through the first window 208. Moreover, the second enclosure 202 can include a second window 210 that aligns with the second camera 400. Accordingly, when the dual-facing camera 104 is disposed within the first enclosure 200 and the second enclosure 202, the second camera 400 can capture video data through the second window 210.

In addition, a first adhesive lens 212 can cover the first window 208. Likewise, a second adhesive lens 214 can cover the second window 210 similar to how the first adhesive lens 212 can cover the first window 208. In an example, the first adhesive lens 212 and the second adhesive lens 214 can function to protect each of the first camera 206 and the second camera 400 respectively when the dual-facing camera 104 is disposed within the cavity 300 in an outdoor environment. IN examples, the first adhesive lens 212 can be configured to be aligned with the first camera 206 as shown with reference to FIG. 2 and the second adhesive lens 214 can be configured to be aligned with the second camera 400 similar to how the first adhesive lens 212 can be aligned with the first camera 206. Any type of adhesive that can allow each of the first adhesive lens 212 and the second adhesive lens 214 to form an airtight fitting with the respective first window 208 and the second window 210 can be used. Examples of adhesives that can be used to form the airtight seal can include heat activated film, pressure sensitive adhesive, very high bond tape (VHB™) available from 3M™ corporation headquartered in Maplewood, Minnesota, Epoxy, or the like. Moreover, each of the first adhesive lens 212 and the second adhesive lens 214 can be formed from any transparent material. Examples can include Glass, PMMA, PC.

Figure 5A:
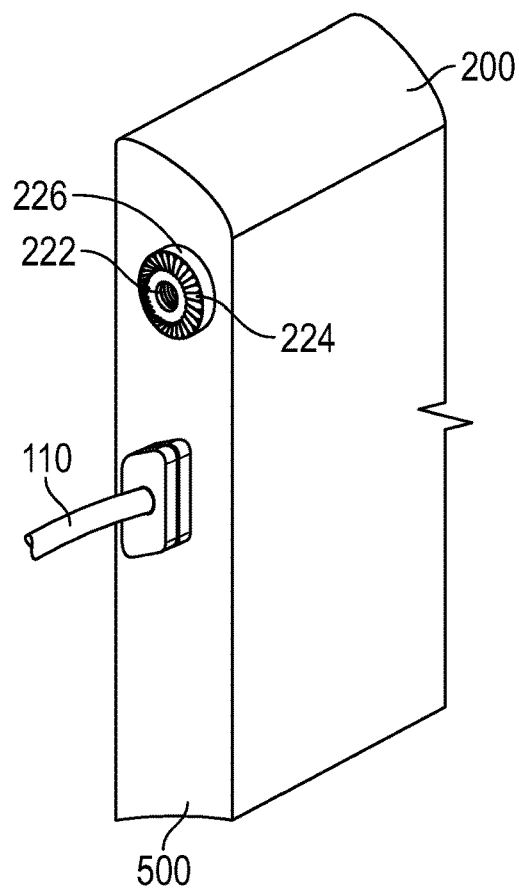
FIGS. 5A and 5B illustrate the coupling of an over molded coupling of the dual-facing camera of FIG. 1 with a port of the first enclosure of FIG. 2, according to some examples.
Figure 5B:
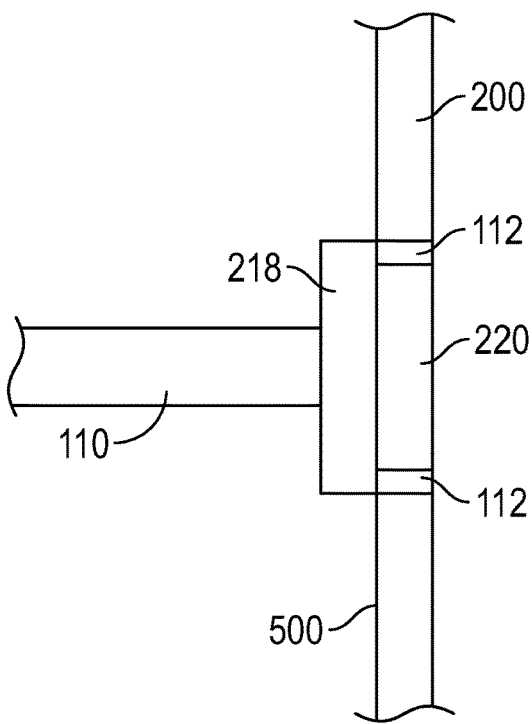

As noted above, the communication coupling 110 transmits data captured by the dual-facing camera 104 to the network node 108. The communication coupling 110 extends from the camera assembly 102 through the port 112. In an example, the communication coupling 110 can include an over molded coupling 216 disposed about the communication coupling 110. In an example, the over molded coupling 216 can include an outer portion 218 and inner portion 220. In an example, the over molded coupling 216 can be formed from rubber, polycarbonate, polyoxymethylene, or the like. As can be seen with reference to FIGS. 5A and 5B, the outer portion 218 is configured to rest against an outer surface 500 of the first enclosure 200 and the inner portion 220 is configured to fit inside of the port 112.

In an example, an adhesive can be used to secure the inner portion 220 within the port 112. Examples of adhesives that can be used to secure the inner portion 220 within the port 112 to create an airtight seal between the inner portion 220 and the port 112 can include Methylmethacrylate adhesives (MMAs), cyanoacrylate adhesives, UV curable adhesives, epoxies, or the like. Moreover, by virtue of securing the inner portion 220 within the port 112, the outer portion 218 forms an airtight seal against the outer surface 500 of the first enclosure 200. In examples, an adhesive can be used to secure the outer portion 218 against the outer surface 500 of the first enclosure 200. Examples of adhesives that can be used to secure the outer portion 218 with the outer surface 500 of the first enclosure 200 can include MMAs, cyanoacrylate adhesives, UV curable adhesives, epoxies, or the like. By virtue of the inner portion 220 forming an airtight seal with the port 112 and the outer portion 218 forming an airtight seal with the outer surface 500 of the first enclosure 200, an airtight seal can be formed between the communication coupling 110 and the port 112.

Returning attention to FIG. 1, as mentioned above, the system 100 can include a network node 108. In an example, the network node 108 can be a vehicle gateway capable of receiving data from the dual-facing camera 104 and providing the data to a remote server 114. The network node can wirelessly communicate with the remote server 114 such that data captured by the dual-facing camera 104 can be transmitted to the remote server 114 and stored at a database 116 for access at a later time. The remote server 104 can be a cloud based server and can include cloud storage services, such as public cloud storage, private cloud storage, hybrid cloud storage, or a community cloud. In an example, the network node 108 can provide global position system (GPS) tracking, cellular connectivity, Wi-Fi connectivity, and data encryption capabilities. An example of the network node 108 that can be used can be the VG54-NA or VG54-NAH, which are vehicle gateways available from Samsara, headquartered in San Francisco, California.

The communication coupling 110 can be a cable that facilitates the exchange of data between the dual-facing camera 104 and the network node 108. In an example, the communication coupling 110 couples with the dual-facing camera 104 and with the network node 108 such that the communication coupling 110 can facilitate data exchange between the dual-facing camera 104 and the network node 110. Examples of the communication coupling 110 can include Samsara Camera Connector (ACC-CM-ANLG) available from Samsara, headquartered in San Francisco, California. Further examples of the communication coupling 110 can include a universal serial bus (USB) cable, High-Definition Multimedia Interface (HDMI) cable, or the like.

Figure 6:
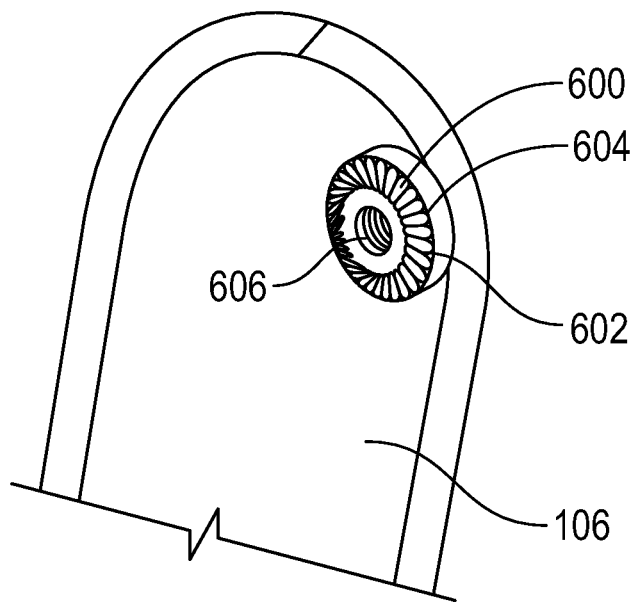
FIG. 6 shows a coupling interface of a mount that can couple with the dual-facing camera of FIG. 1, according to some examples.
Figure 7:
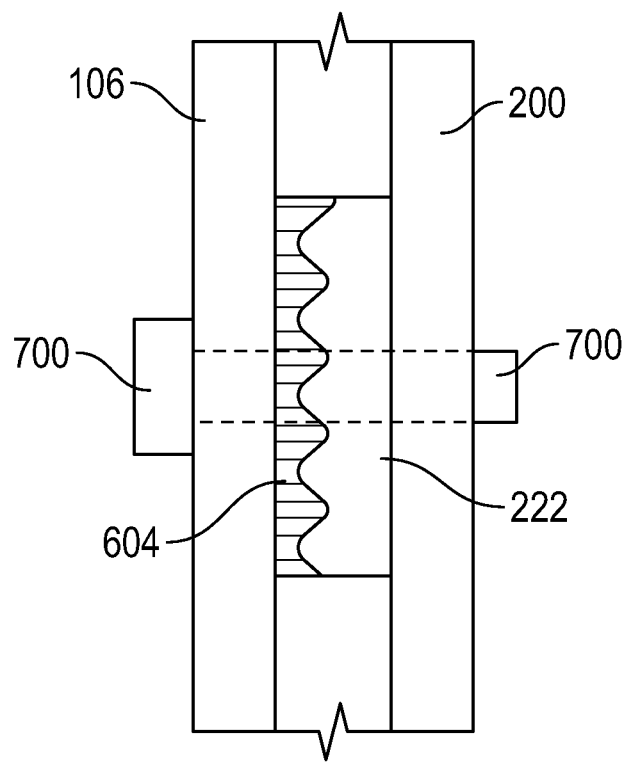
FIG. 7 illustrates the dual-facing camera of FIG. 1 engaging with the coupling interface of FIG. 6, according to some examples.

As mentioned above, the camera assembly 102 can couple with a mount 106 in order to keep the camera assembly 102 stationary during use of the system 100. In some examples, the enclosure 200 can include a first mounting interface 222 that is configured to engage with the mount 106. The mounting interface 222 can include canyons 224 and ridges 226 that are configured to engage with canyons 600 (FIG. 6) and ridges 602 (FIG. 6) of a second mounting interface 604 (FIG. 6) of the mount 106. In an example, the canyons 224 and the ridges 226 form a first textured surface of the mounting interface 222. Similarly, the canyons 600 and the ridges 602 form a second textured surface of the mounting interface 604 such that the mounting interface 222 rigidly couples and locks with the mounting interface 604 via the textured surfaces, as shown with reference to FIG. 7. Furthermore, the mounting interface 222 can include threads 228 and the mounting interface 604 can include threads 606. In an example, a fastener 700 can engage with the threads 228 and 606 when the mounting interface 222 rigidly couples and locks with the mounting interface 604 via the textured surfaces, as shown with reference to FIG. 7.

Figure 8A:
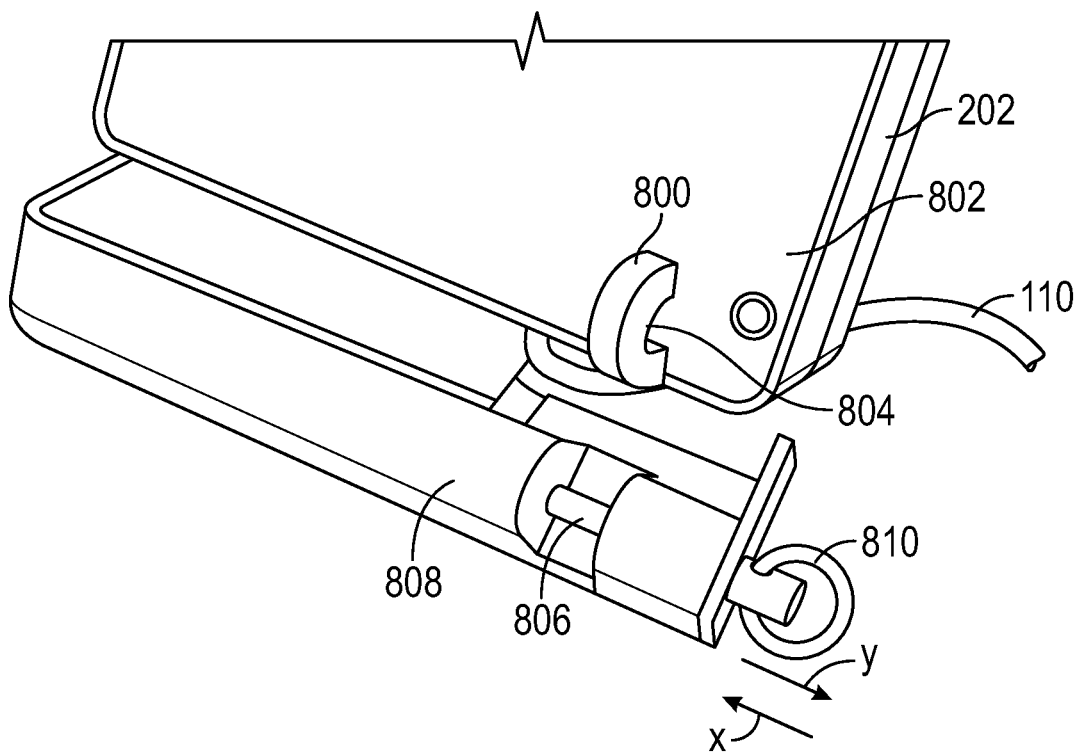
FIGS. 8A and 8B shows an alternative example of coupling the dual-facing camera of FIG. 1 with a mount, according to some examples.
Figure 8B:
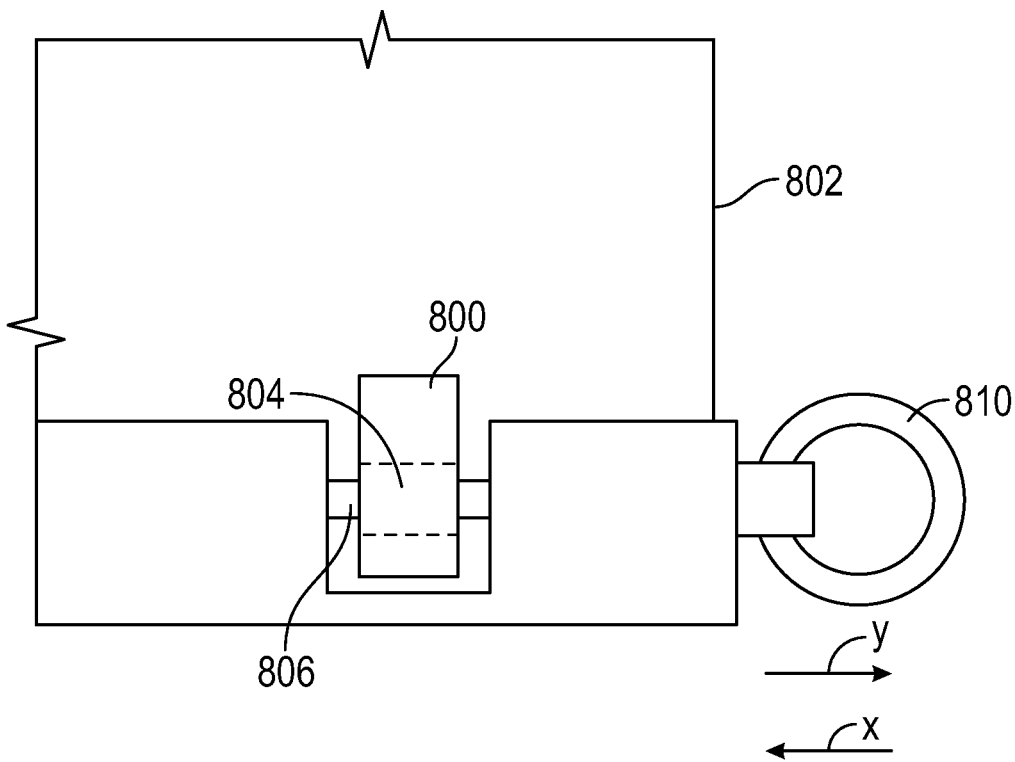

In further examples, the camera assembly 102 can releasably couple to the mount 106. More specifically, making reference to FIGS. 8A and 8B, the second enclosure 202 can have a boss 800 extending from a rear surface 802 of the second enclosure 202. The boss can have a passage 804 configured to receive a pin 806 of a mount 808. It should be noted that, while not depicted, the mount 808 can have a configuration similar to the mount 106. In an example, the pin 806 can be coupled with a key 810. The key can be movable along a direction X and a direction Y. The key 810 can be moved in the direction X to engage the pin 806 with the boss 800 via the boss passage 804. The key 810 can be moved in the direction Y to disengage the pin 806 with the boss 800 via the boss passage 804. In particular, when the pin 806 engages the boss passage 804, the pin 810 travels through the boss passage 804, as shown with reference to FIG. 8B.

In an example, the key 810 can be spring loaded with a tension spring such that the tension spring biases the key along the direction X thereby maintaining engagement of the pin 806 with the boss 800 via the boss passage 804. In this example, the key 810 can be moved in the direction X to engage the pin 806 with the boss 800 via the boss passage 804.

In examples, the camera assembly can mount to open-air vehicles in outdoor environments without regard to temperature fluctuations and inclement weather. As discussed above, the first enclosure 200 and the second enclosure 202 can each be formed of materials capable of withstanding extreme temperature fluctuations. Moreover, the camera assembly 102 can be formed such that the cavity 300 is airtight. Thus, outdoor elements, such as rain, snow, sleet, etc., is prevented from entering the cavity 300 and the dual-facing camera 104 disposed therein.

Figure 9:
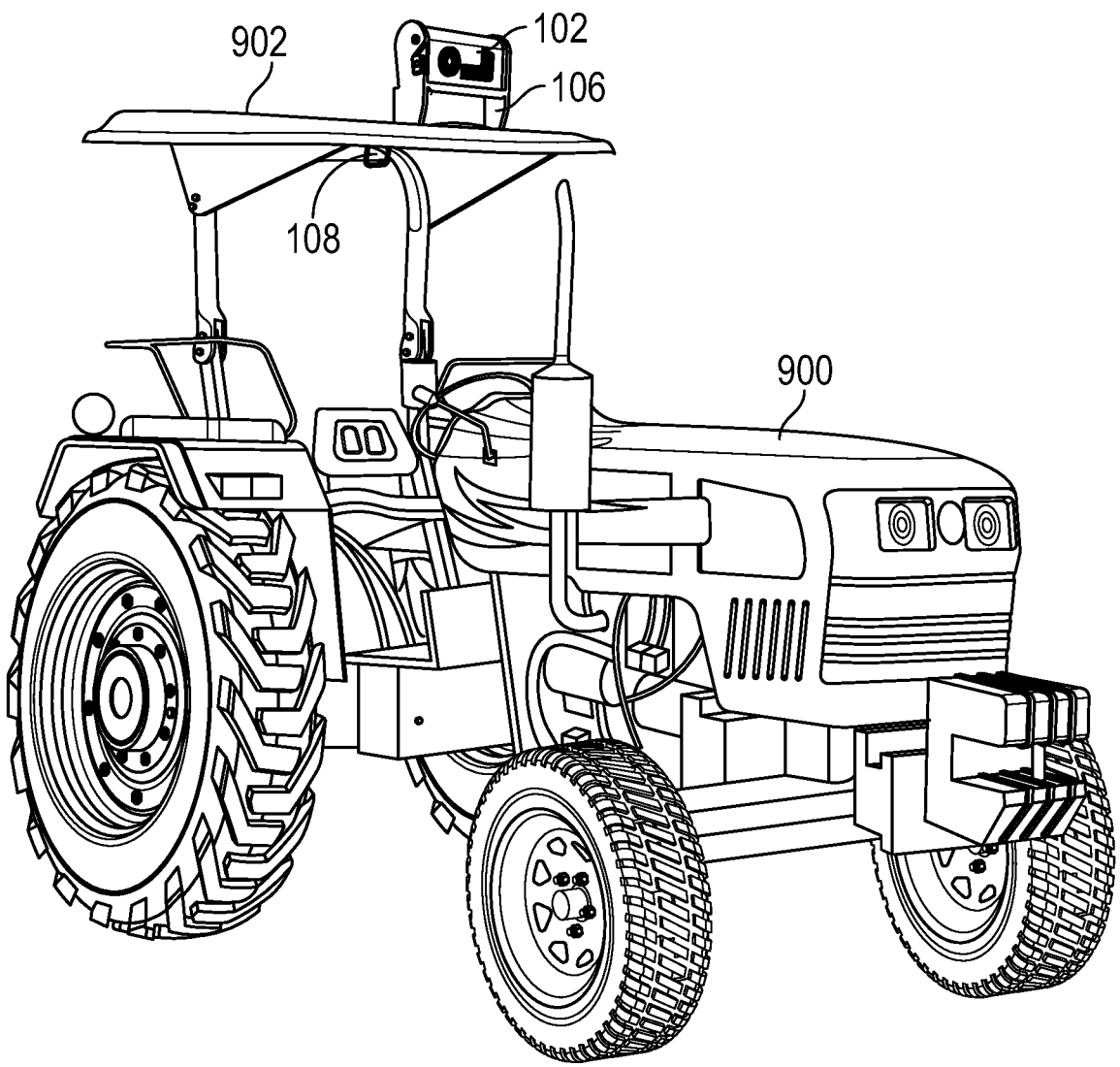
FIG. 9 illustrates the mounting of the system of FIG. 1 to a vehicle, according to some examples.

By virtue of the system 100 being able to be implemented in outdoor environments, the system 100 can be implemented with any type of vehicle, including vehicles in an open air fleet. To further illustrate, now making reference to FIG. 9, the camera assembly 102 can be mounted to an outside surface 902 of a vehicle 900, such as a tractor. In an example, the camera assembly 102 can mount to the vehicle 900 via the mount 106. More specifically, the mount 106 can rigidly couple with the vehicle 900 using any suitable technique. Examples can include an adhesive, welding, rivets, or the like. It should be noted that while a tractor is shown, the system 100 can be implemented with any type of vehicle. Examples can include forklifts, bulldozers, airline equipment, transport carts such as golf carts, scooters, all-terrain vehicles, motorcycles, or any other type of vehicle that does not have an enclosed cab. As noted above, the system 100 can include the network node 108, which can be a vehicle gateway. The network node can include GPS tracking and cellular communications. Thus, a location of the vehicle 900 can be continuously monitored and communication can be enabled via the cellular network with the vehicle 900. Moreover, the network node 108 can be configured to track movement and speed associated with the vehicle 900. Furthermore, visual activities of the vehicle 900 can be recorded via the dual-facing camera 104 and uploaded to the remote server 114.

The above detailed description includes references to the accompanying drawings, which form a part of the detailed description. The drawings show, by way of illustration, specific examples in which the invention can be practiced. Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of The invention should be determined with reference to the appended claims, along with the full scope of equivalents to which such claims are entitled.

The invention claimed is:

1. A system comprising:
    a camera assembly that includes:
        a first enclosure having a first window;
        a second enclosure having a second window, the second enclosure opposite the first enclosure and configured to couple with the first enclosure to form a cavity, the second enclosure having a boss disposed on a back surface of the second enclosure, the boss extending from the back surface and defining a passage between the boss and the back surface;
        a port disposed in one of the first enclosure and the second enclosure;
        a dual-facing camera disposed within the cavity, the dual-facing camera having a first camera facing a first direction and a second camera facing a second direction opposite the first direction where the first camera aligns with the first window and the second camera aligns with the second window when the dual-facing camera is disposed within the cavity, wherein the port is configured to cause data captured by the dual-facing camera to be sent to a remote server via a vehicle gateway;
        a first adhesive lens coupled with the first window and configured to be aligned with the first camera, wherein the first adhesive lens includes an adhesive that adheres to the first window to form an airtight seal with the first window;
        a second adhesive lens coupled with the second window and configured to be aligned with the second camera, wherein the second adhesive lens includes the adhesive that adheres to the second window to form an airtight seal with the second window; and
        a mount disposed under the second enclosure, the mount having a pin coupled with a key and movable in a first direction and a second direction opposite the first direction with the key, wherein the passage is configured to receive the pin where the pin is movable in the first direction and the second direction within the passage such that the pin passes through the boss and rigidly couples the second enclosure with the mount.

2. The system of claim 1, the camera assembly further comprising a gasket disposed between the first enclosure and the second enclosure, the gasket configured to provide an airtight seal between the first enclosure and the second enclosure when the second enclosure couples with the first enclosure.

3. The system of claim 1, further comprising a communication coupling extending from the camera assembly, the communication coupling being coupled with the dual-facing camera where the communication coupling extends from the dual-facing camera and through the port, wherein the communication coupling is a universal serial bus (USB) cable.

4. The system of claim 3, the camera assembly further comprising an over molded coupling disposed around the communication coupling, the over molded coupling configured to engage with the port and provide an airtight seal between the port and the communication coupling.

5. A system comprising:
    a camera assembly that includes:
        a first enclosure having a first window;
        a second enclosure having a second window, the second enclosure opposite the first enclosure and configured to couple with the first enclosure to form a cavity, the second enclosure having a boss disposed on a back surface of the second enclosure, the boss extending from the back surface and defining a passage between the boss and the back surface;
        a port disposed in one of the first enclosure and the second enclosure;
        a dual-facing camera disposed within the cavity, the dual-facing camera having a first camera facing a first direction and a second camera facing a second direction opposite the first direction where the first camera aligns with the first window and the second camera aligns with the second window when the dual-facing camera is disposed within the cavity, wherein the port is configured to cause data captured by the dual-facing camera to be sent to a remote server via a vehicle gateway;
        a communication coupling extending from the camera assembly, the communication coupling being coupled with the dual-facing camera where the communication coupling extends from the dual-facing camera and through the port;
        a mount disposed under the second enclosure, the mount having a pin coupled with a key and movable in a first direction and a second direction opposite the first direction with the key, wherein the passage is configured to receive the pin where the pin is movable in the first direction and the second direction within the passage such that the pin passes through the boss and rigidly couples the second enclosure with the mount;
        a first adhesive lens coupled with the first window and configured to be aligned with the first camera, wherein the first adhesive lens includes an adhesive that adheres to the first window to form an airtight seal with the first window; and
        a second adhesive lens coupled with the second window and configured to be aligned with the second camera, wherein the second adhesive lens includes the adhesive that adheres to the second window to form an airtight seal with the second window.

6. The system of claim 5, the camera assembly further comprising a gasket disposed between the first enclosure and the second enclosure, the gasket configured to provide an airtight seal between the first enclosure and the second enclosure when the second enclosure couples with the first enclosure.

7. The system of claim 5, wherein the communication coupling is a universal serial bus (USB) cable.

8. The system of claim 7, the camera assembly further comprising an over molded coupling disposed around the communication coupling, the over molded coupling configured to engage with the port and provide an airtight seal between the port and the communication coupling.

9. The system of claim 5, the system further comprising a network node coupled with the communication coupling, the network node configured to receive data captured by the dual-facing camera and wirelessly transmit the data to a remote server.

10. The system of claim 5, wherein the communication coupling is a universal serial bus (USB) cable and the camera assembly further comprises an over molded coupling disposed around the communication coupling, the over molded coupling configured to engage with the port and provide an airtight seal between the port and the communication coupling.

11. A system comprising:
    a camera assembly that includes:

a first enclosure having a first window;

a second enclosure having a second window, the second enclosure opposite the first enclosure and configured to couple with the first enclosure to form a cavity, the second enclosure having a boss disposed on a back surface of the second enclosure, the boss extending from the back surface and defining a passage between the boss and the back surface;

a port disposed in one of the first enclosure and the second enclosure;

a dual-facing camera disposed within the cavity, the dual-facing camera having a first camera facing a first direction and a second camera facing a second direction opposite the first direction where the first camera aligns with the first window and the second camera aligns with the second window when the dual-facing camera is disposed within the cavity, wherein the port is configured to cause data captured by the dual-facing camera to be sent to a remote server via a vehicle gateway;

a communication coupling extending from the camera assembly, the communication coupling being coupled with the dual-facing camera where the communication coupling extends from the dual-facing camera and through the port;

a first adhesive lens coupled with the first window and configured to be aligned with the first camera, wherein the first adhesive lens includes an adhesive that adheres to the first window to form an airtight seal with the first window;

a second adhesive lens coupled with the second window and configured to be aligned with the second camera, wherein the second adhesive lens includes the adhesive that adheres to the second window to form an airtight seal with the second window; and a mount disposed under the second enclosure, the mount having a pin coupled with a key and movable in a first direction and a second direction opposite the first direction with the key, wherein the passage is configured to receive the pin where the pin is movable in the first direction and the second direction within the passage such that the pin passes through the boss and rigidly couples the second enclosure with the mount.

12. The system of claim 11, the camera assembly further comprising a gasket disposed between the first enclosure and the second enclosure, the gasket configured to provide an airtight seal between the first enclosure and the second enclosure when the second enclosure couples with the first enclosure.

* * * * *